United States Patent [19]

Ohyama

[11] 4,257,286
[45] Mar. 24, 1981

[54] PRECISION DRIVING APPARATUS

[75] Inventor: Isao Ohyama, Yokohama, Japan

[73] Assignee: Nippon Kogaku K.K., Tokyo, Japan

[21] Appl. No.: 21,190

[22] Filed: Mar. 16, 1979

[30] Foreign Application Priority Data

Mar. 22, 1978 [JP] Japan .............. 53/35500[U]

[51] Int. Cl.³ .............................................. F16H 1/04
[52] U.S. Cl. ........................................ 74/422; 74/409;
74/411
[58] Field of Search ................ 74/89.11, 89.12, 89.16,
74/89.17, 89.18, 89.19, 109, 406, 409, 410, 411,
422

[56] References Cited

U.S. PATENT DOCUMENTS

| 2,466,218 | 4/1949 | Farrell et al. | 74/411 X |
| 3,854,418 | 12/1974 | Bertin | 74/422X |

FOREIGN PATENT DOCUMENTS

| 1087020 | 8/1960 | Fed. Rep. of Germany | 74/409 |
| 1300395 | 7/1969 | Fed. Rep. of Germany | 74/422 |
| 583953 | 1/1947 | United Kingdom | 74/422 |
| 305296 | 7/1971 | U.S.S.R. | 74/422 |

Primary Examiner—Lawrence J. Staab
Attorney, Agent, or Firm—Fitzpatrick, Cella, Harper & Scinto

[57] ABSTRACT

A precision driving apparatus of the type comprising a pinion and a rack in mesh with the pinion is improved to assure always a good engagement between the pinion and the rack throughout the length of the rack. The rack is formed by monoblock molding of synthetic resin material so as to comprise, as the integral parts thereof, a tooth part, a base part, a connection part and a distance limitation part. The connection part elastically connects the tooth part and base part at both ends thereof in such manner that the tooth part may be displaced only in the direction normal to the direction in which the rack is moved, without any deformation of the tooth part itself. The limitation part serves to limit the distance between the tooth part and base part to a value less than the module of the teeth of the rack to prevent the engagement between the tooth part and the pinion from getting shallow by an external force working in the direction of movement of the rack and to prevent the tooth top of the tooth part or of the pinion from being broken thereby.

3 Claims, 5 Drawing Figures

PRECISION DRIVING APPARATUS

BACKGROUND OF THE INVENTION

1. Field of the Invention

The present invention relates to a precision driving apparatus of the type comprising a rack and a pinion meshed with each other. Such precision driving apparatus is used, for example, in surveying instruments to move the focusing lens thereof along the optical axis. The present invention is directed to improvements in the structure of the rack of such precision driving apparatus.

2. Description of the Prior Art

As is well known to those skilled in the art, adjustment of engagement between pinion and rack in a precision driving mechanism is very troublesome and requires considerable time and labour. Too much play in meshing results in chattering whereas too close meshing results in grating. Even after a proper adjustment has been once made, the engagement becomes loose with use for a long time and readjustment is required.

A known solution to the above mentioned problem is to provide a notch extending along most of the length of the rack on a surface of the rack opposite to the toothed surface thereof so as to give the rack resiliency to some extent. According to the solution, a better engagement is assured between rack and pinion at the middle portion of the rack where it is allowed to flex. However, at the both end portions of the rack there is assured no satisfactory engagement between the two members because of lack of flexure of the rack at the end portions. There, the engagement becomes worse and generally the teeth grate on each other. Although the rack can flex at the middle portion, it is generally difficult to give the rack adequate flexture by this solution. Even when this solution was employed, a fine adjustment was still required at the time of assembly.

SUMMARY OF THE INVENTION

Accordingly, it is an object of the invention to provide a precision driving apparatus in which the engagement of a rack with a pinion can be maintained in a good state throughout the full length of the rack.

It is another object of the invention to provide a precision driving apparatus of the type mentioned above which is also suitable for mass production.

Other and further objects, features and advantages of the invention will appear more fully from the following description taken in connection with the accompanying drawing.

DETAILED DESCRIPTION OF THE PREFERRED EMBODIMENTS

Figure 1:
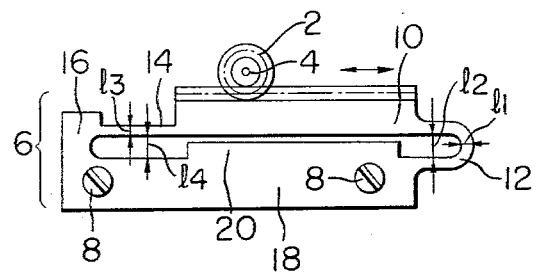
FIG. 1 shows a first embodiment of precision driving apparatus in accordance with the present invention.

In FIG. 1 showing the first embodiment of the invention, a pinion 2 is in engagement with a rack 6. The pinion 2 is rotated by a pinion shaft 4 rotatably fitted to a stationary member, not shown. The rack 6 is secured to a movable member, not shown, by screws 8. The movable member is intended to move relative to a stationary member (not shown) together with the rack. To this end, the rack 6 has a toothed part 10 in mesh with the pinion 2. The toothed part 10 is connected to a base part 18 by a connection part comprising a curved elastic portion 12, a linear elastic portion 14 and a fixed portion 16. To limit the displacement of the toothed part 10 to a value less than the module, there is provided a limitation part 20 on the base part 18. All of the parts 10, 12, 14, 16, 18 and 20 constituting together the rack 6, are formed unitarily by monoblock molding of synthetic resin material.

The curved elastic portion 12 connects one end of the toothed part 10 with one end of the base part 18. The thickness $l_1$ and the width (measured in the direction normal to the plane of the drawing) of the curved portion are so determined that it can be elastically deformed before the toothed part 10 is subjected to flexture by a force exerted thereon in the direction normal to the moving direction of the rack (direction of arrow). Furthermore, the distance $l_2$ between the two legs of the U-shaped curved portion 12 is so selected as to be sufficiently large to assure an elastic action for the curved portion itself.

The linear elastic portion 14 extends from the other end of the toothed part 10 to the fixed portion 16 in the moving direction of the rack 6. The thickness $l_3$ and the width (size measured in the direction normal to the plane of the drawing) of the portion 16 are so determined that the elastic action of the linear elastic portion 16 can be produced exclusively in the direction normal to the moving course of the rack. The fixed portion 16 through which the linear elastic portion 14 and base portion 18 are joined together is so determined that between the linear elastic portion 14 and base portion 18 there is provided a sufficiently large spacing $l_4$ to assure the elastic action of the linear portion 14. Also, the thickness and width of the fixed portion are so selected that it can resist against deformation in the moving direction of the rack so as to prevent any deformation of the toothed part 10 relative to the base portion 18 in the same direction.

Setting of relative position between the pinion 2 and rack 6 has to be made in such manner that the toothed portion 10 of the rack is slightly pressed against the pinion 2. By setting the rack and pinion in this manner there is obtained a good engagement with adequate resiliency throughout the length of the toothed part 10. As schematically illustrated in FIG. 2A, the teeth of the rack come into mesh closely with the teeth of the pinion so that no chattering or grating may be produced at any position of the rack.

Figure 2A:
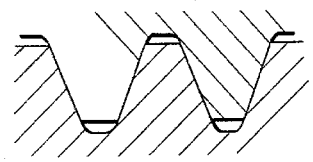
FIG. 2 illustrates the engagement between the pinion and rack.
Figure 2B:
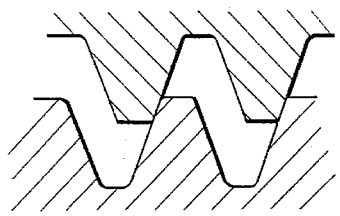

Since, as previously noted, the limitation part 20 serves to limit the amount of allowable displacement of the toothed part 10 to a value less than module, a deep and close engagement as shown in FIG. 2A is maintained even when any external force such as shock is applied to the engaged portion in the direction of movement of the rack. If there were not such limitation part, the deep and close engagement could be altered by an external force and the pinion and rack could assume a state of shallow engagement as illustrated in FIG. 2B in which the teeth are in mesh with each other only with their narrow and weak tip portions being in contact. As a result, the teeth would be broken away at the tip portion to which a strong force is applied. The provision of limitation part 20 prevents such breaking of teeth and also, as a matter of course, prevents the pinion 2 and rack 6 from being disengaged from each other by some external force exerted thereon in the direction of movement of the rack 6.

Figure 3:
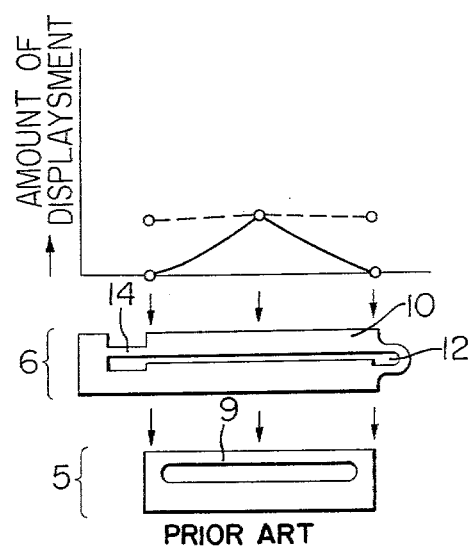
FIG. 3 shows relation curves between load position on the rack and displacement of the tooth part, the solid line curve being for the prior art rack and the broken line curve being for the rack of the invention.

Relation curve between load position and displacement shown in FIG. 3 clearly demonstrates the effect of the present invention.

For the purpose of comparison, the rack 6 according to the invention and a rack 5 according to the prior art were used for the test, the latter having a toothed part 9. A load which was the same for both racks was applied to the rack 5 and the rack 6 respectively at three different load positions indicated by arrows under the abscissa. Displacements of the toothed part 9 or 10 caused by the load were measured and then plotted as shown in FIG. 3 with the amount of displacement being taken on the ordinate. The solid line curve is that obtained from the prior art rack 5 whereas broken line curve is that for the rack 6 of the present invention.

In case of the prior art, as seen from the solid line curve, the displacement which represents the magnitude of flexture of the toothed part 9 is maximum at the center of the toothed part and is gradually decreased toward both ends thereof where the displacement becomes 0 (zero).

In contrast with that, in case of the rack according to the invention in which the load is received not by the toothed part 10 but by the curved elastic portion 12 and linear elastic portion 14, the toothed part 10 scarcely flexes and therefore the displacement is kept almost constant throughout the length of the toothed part. This means that with the rack according to the invention, the condition under which the toothed part 10 is in mesh with the pinion at both ends a is substantially equal to that at the center of the toothed part.

Figure 4:
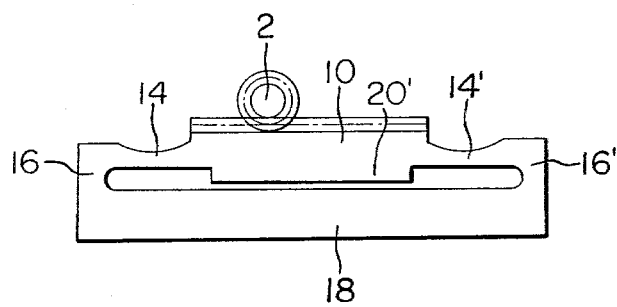
FIG. 4 shows a second embodiment of the invention.

FIG. 4 shows the second embodiment of the invention. This embodiment differs from the above described FIG. 1 embodiment in that in place of the curved elastic portion 12 in FIG. 1 there are used a linear elastic portion 14' and a fixed portion 16' and that a limitation part 20' is provided on the toothed part 10 instead of the limitation part 20 on the base part shown in FIG. 1. The embodiments shown in FIGS. 1 and 4 are entirely the same in function.

For the second embodiment wherein two linear elastic portions 14 and 14' are used, the two portions must be sufficiently long to obtain adequate resiliency. Therefore, the size of the rack inevitably becomes larger as compared with the first embodiment wherein a linear elastic portion 14 and a curved elastic portion 12 are used. This is a disadvantage the second embodiment has.

The rack designed according to the invention can be manufactured in a simple manner by monoblock molding of synthetic resin material. Although it has a relatively complicated structure, it can be manufactured inexpensively and simply by mass production.

It is evident from the foregoing that in accordance with the invention there is provided a precision driving mechanism in which the pinion and rack are always kept in a well engaged state throughout the length of the rack and which is suitable for mass production.

While the invention has been particularly shown and described with reference to preferred embodiments thereof, it will be understood by those skilled in the art that the foregoing and other changes in form and detailes can be made therein without departing from the spirit and scope of the invention.

I claim:

1. In a precision driving apparatus comprising a pinion and a rack, said rack comprising the following integral parts (a) to (d) formed together by monoblock molding of synthetic resin material:
   (a) a toothed part having teeth engageable with the pinion;
   (b) a base part for supporting said toothed part, said base part being disposed opposed to a surface of said toothed part lying at the opposite side to the toothed surface side;
   (c) a connection part for resiliently connecting both ends of said toothed part with both ends of said base part so as to allow said toothed part to be displaced only in the direction normal to the direction in which said rack is moved, without said toothed part itself being deformed; and
   (d) a limitation part for limiting the distance between said toothed part and said base part to a value less than the module of the teeth of said toothed part to prevent the engagement between said toothed part and said pinion from getting shallow by any external force exerted thereon in the direction of movement of said rack and to prevent the tooth top of said toothed part or of said pinion from being broken away.

2. A precision driving apparatus as claimed in claim 1, wherein said limitation part is formed by a projection protruding from the middle portion of said toothed part or said base part into a space surrounded by said toothed part, base part and connection part toward the part opposed to the part from which said projection extends.

3. A precision driving apparatus as claimed in claim 2, wherein said connection part is composed of:
   (e) a curved elastic portion extending from one end of said toothed part to the corresponding end of said base part while describing a U-shaped curve with the distance between the two legs being sufficiently large to ensure an elastic action for said curved elastic portion;
   (f) a linear elastic portion extending from the other end of said toothed part in the direction of movement of said rack, said linear elastic portion having an elastic action only in the direction normal to said direction of movement of rack; and
   (g) a fixed portion for connecting said linear elastic portion with said base portion while providing between said linear elastic portion and said base portion a sufficiently large spacing to assure the elastic action of said linear elastic portion, said fixed portion itself being non deformable in the direction of movement of the rack.

* * * * *